US009654652B2

United States Patent
Futatsumori (10) Patent No.: US 9,654,652 B2
(45) Date of Patent: May 16, 2017

(54) CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yuki Futatsumori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/816,958

(22) Filed: Aug. 3, 2015

(65) Prior Publication Data

US 2016/0041794 A1 Feb. 11, 2016

(30) Foreign Application Priority Data

Aug. 7, 2014 (JP) ................. 2014-161641

(51) Int. Cl.
- *G06F 3/12* (2006.01)
- *H04N 1/00* (2006.01)
- *G03G 15/00* (2006.01)

(52) U.S. Cl.
CPC ........... *H04N 1/0032* (2013.01); *G03G 15/50* (2013.01); *G03G 15/6508* (2013.01); *G03G 15/502* (2013.01); *G03G 2215/00126* (2013.01)

(58) Field of Classification Search
CPC ..... G06F 3/125; G06F 3/1204; H04N 1/0032; G03G 15/50; G03G 15/502; G03G 15/6508; G03G 2215/00126
USPC ........................... 358/1.13, 1.15, 2.1; 399/16
See application file for complete search history.

(56) References Cited

U.S. PATENT DOCUMENTS

| 6,922,535 B2 | 7/2005 | Kim | |
|---|---|---|---|
| 7,952,731 B2 * | 5/2011 | Utsunomiya | G03G 15/5062 358/1.13 |
| 8,780,411 B2 * | 7/2014 | Kiuchi | G03G 15/50 358/2.1 |
| 2009/0091781 A1 * | 4/2009 | Nishimura | G06F 3/1204 358/1.15 |
| 2009/0153902 A1 * | 6/2009 | Yamamoto | G06F 3/1205 358/1.15 |
| 2011/0135322 A1 * | 6/2011 | Masuyama | B41J 11/485 399/16 |
| 2012/0218589 A1 * | 8/2012 | Watanabe | G06F 3/1205 358/1.15 |
| 2012/0251133 A1 * | 10/2012 | Shindo | G03G 15/502 399/21 |
| 2013/0201520 A1 * | 8/2013 | Sato | G06K 15/02 358/1.15 |

(Continued)

FOREIGN PATENT DOCUMENTS

JP 2004-34711 A 2/2004

*Primary Examiner* — Allen H Nguyen
(74) *Attorney, Agent, or Firm* — Canon U.S.A., Inc. IP Division (57) ABSTRACT

A control apparatus includes a setting unit that sets information on a print medium for a paper feed unit, a determination unit that, if the setting unit sets the information on the print medium, determines whether the set information on the print medium can be reflected in a setting condition for a specific mode, and an update unit that, if the determination unit determines that the set information on the print medium can be reflected, updates the setting condition for the specific mode to the information on the print medium.

21 Claims, 9 Drawing Sheets (56) References Cited

U.S. PATENT DOCUMENTS

2013/0274911 A1* 10/2013 Imai .................. B65H 7/20
  700/117
2014/0098405 A1* 4/2014 Awano ............... G06K 15/005
  358/2.1

* cited by examiner

FIG. 5A
REGISTRATION SCREEN

501

Registration of Information for Cassette 1
-------------------------------------------
Register paper information
for Cassette 1.

Size    A4
Type    Plain Paper

[ Register ]

FIG. 5B
SIZE SELECTION SCREEN

502

Registra...
Registe
for Cas
Size
Type

- A4
- Letter
- B5
- A5
- Others

FIG. 5C
TYPE SELECTION SCREEN

503

Registra...
Registe
for Cas
Size
Type

- Plain Paper
- Glossy Paper
- Matte Paper
- Envelope
- Postcard

FIG. 10A  COPY MODE

| SUPPORTED TYPE | SUPPORTED SIZE | NON-SUPPORTED COMBINATION |
|---|---|---|
| PLAIN PAPER | A4 | POSTCARD × L-SIZE |
| GLOSSY PAPER | B5 | — |
| MATTE PAPER | A5 | — |
| POSTCARD | L-SIZE | — |
| ⋮ | ⋮ | — |
|  |  | — |

FIG. 10B  PHOTO MODE

| SUPPORTED TYPE | SUPPORTED SIZE | NON-SUPPORTED COMBINATION |
|---|---|---|
| PLAIN PAPER | A4 | POSTCARD × L-SIZE |
| GLOSSY PAPER | L-SIZE | POSTCARD × 2L-SIZE |
| MATTE PAPER | 2L-SIZE | — |
| POSTCARD | POSTCARD | — |
| ⋮ | ⋮ | — |
|  |  | — |

FIG. 10C  FAX MODE

| SUPPORTED TYPE | SUPPORTED SIZE | NON-SUPPORTED COMBINATION |
|---|---|---|
| PLAIN PAPER | A4 | — |
| — | LETTER | — |
| — | — | — |
| — | — | — |
| — | — | — |
| — | — | — |

CONTROL APPARATUS, CONTROL METHOD, AND NON-TRANSITORY COMPUTER-READABLE STORAGE MEDIUM

BACKGROUND

Field

Aspects of the present invention are generally related to a control apparatus, a control method, and a non-transitory computer-readable storage medium.

Description of the Related Art

In image forming apparatuses, a function of detecting insertion of a paper cassette and automatically displaying a registration screen for the paper cassette is known. In an apparatus disclosed in Japanese Patent Laid-Open No. 2004-34711, a paper cassette to be designated as a certain paper type is determined according to open/closed states of the paper cassette and whether paper is loaded into the paper cassette. Then, display priority on a display unit is designated for circumstances that may occur in the apparatus, and a menu for designating a paper type is displayed in response to display priority circumstances higher than a paper type designation operation not occurring.

However, even if paper information on paper to be subjected to printing is registered for a paper cassette, settings may have to be newly set in another mode. For example, after the registration, the above-described paper information may have to be input again as print settings for a copy mode. This is a problem caused by paper settings being stored for each individual mode of the apparatus.

In existing many multi-function printers (MFPs), paper settings are stored for each mode. This is done because paper that can be dealt with differs according to each mode. If paper settings are stored in a shared manner, a contradiction in settings may arise frequently. This is also done because, in the case where paper that a user wants to use differs according to each mode, certain paper information set for each mode increases user convenience.

However, inputting the same information twice reduces usability.

SUMMARY

A control apparatus according to the present invention includes a setting unit configured to set information on a print medium for a paper feed unit, a determination unit configured to, if the setting unit sets the information on the print medium, determine whether the set information on the print medium can be reflected in a setting condition for a specific mode, and an update unit configured to, if the determination unit determines that the set information on the print medium can be reflected, update the setting condition for the specific mode to the information on the print medium.

Further features of the present disclosure will become apparent from the following description of exemplary embodiments with reference to the attached drawings.

DESCRIPTION OF THE EMBODIMENTS

First Embodiment

Exemplary embodiments will be described below with reference to the drawings. It is noted that the relative placement of components of an apparatus used in these embodiments, the shape of the apparatus, and so forth are merely examples, and are not seen to be limiting.

Figure 1:
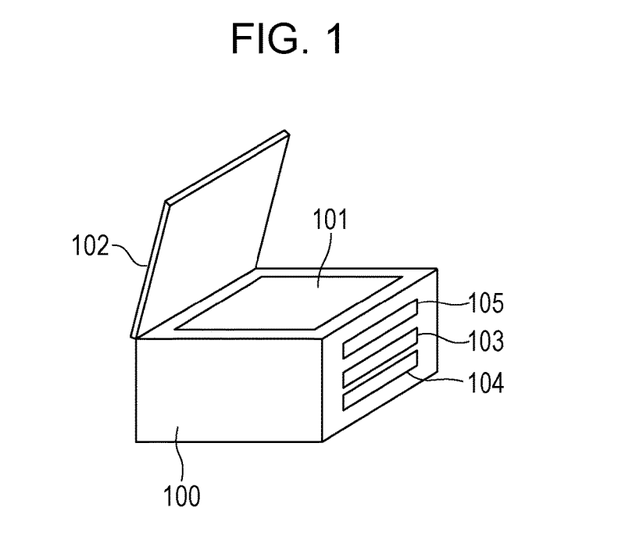
FIG. 1 is a schematic view illustrating the external appearance of a printing apparatus according to a first embodiment.

FIG. 1 is a schematic view illustrating the external appearance of a printing apparatus according to a first embodiment. In the present embodiment, a multi-function printer (MFP) having a scanning function (scanner) will be described as an example. The printing apparatus is not limited to this.

In FIG. 1, a printing apparatus 100 includes a document positioning plate 101, a document cover 102, a plurality of paper cassettes (paper cassette 1 and paper cassette 2), and a paper ejection tray 105.

The document positioning plate 101 is a transparent glass plate, and is used when a document is placed thereon and scanned with the scanner. The document cover 102 is a cover for keeping scanning light from leaking out when a document is scanned with the scanner, and is configured to be able to cover the document positioning plate 101. The paper cassettes 1 and 2 (paper cassette 103 and paper cassette 104) enable paper of various sizes to be loaded therein. Sheets of paper loaded in the paper cassettes 103 and 104 are conveyed one by one to a printing section, subjected to printing, and ejected to the paper ejection tray 105. Although FIG. 1 illustrates an example of the apparatus including the two paper cassettes, it is noted that the apparatus includes one or more paper cassettes, that is, may include one, or three or more paper cassettes. A printing method for printing an image is not limited to an ink jet method using liquid ink for image printing to be described. Solid ink may be used as a recording agent, and various methods, such as an electrophotographic method using toner and a dye-sublimation method, may be employed. In addition, the apparatus is not limited to an apparatus that performs color recording using recording agents of multiple colors, and may be an apparatus that performs monochrome recording using only black (including gray). Moreover, printing is not limited to printing of a visible image, and may be printing of an invisible or hardly-visible image, or printing of various objects other than a typical image, such as a wiring pattern, a physical pattern in producing a component, and a DNA base sequence. That is to say, the present embodiment is applicable to various types of printing apparatuses as long as they can apply a recording agent to a recording material.

Furthermore, in the present embodiment, paper will be described as an example of a print medium; however, the material of the print medium is not limited to paper, and various types of paper that can be subjected to a printing process may be used.

Figure 2:
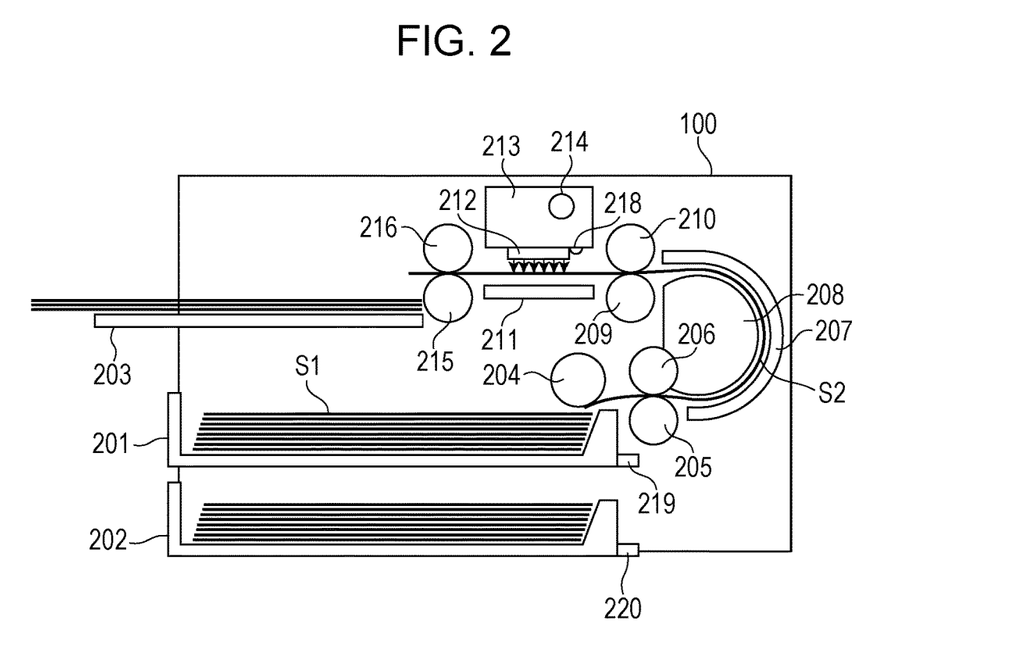
FIG. 2 is a schematic view illustrating the structure of a paper conveying section and a printing mechanism section of the printing apparatus according to the first embodiment.

FIG. 2 is a schematic view illustrating the internal structure of a paper conveying section and a printing mechanism section in the printing apparatus 100 according to the present embodiment. The printing apparatus 100 includes a paper cassette 201, a paper cassette 202, and a paper ejection tray 203 which respectively correspond to the paper cassette 103, the paper cassette 104, and the paper ejection tray 105 that are illustrated in FIG. 1. The printing apparatus 100 also includes a print head 212, a carriage 213, and a guide rail 214 that serve as a printing unit.

Recording paper S1 loaded in the paper cassette 201 is picked up by a paper feed roller 204 driven by a conveyance motor, which is not illustrated, sent between a conveyance roller 205 and a conveyance roller 206, and conveyed by the conveyance rollers 205 and 206. Recording paper S2 having been conveyed by the conveyance roller 205 and the conveyance roller 206 is conveyed in such a manner as to make a U-turn by using a conveyance path including a paper conveying guide 207 and a paper conveying guide 208, and sent to a conveyance roller 209 and a conveyance roller 210. Although not illustrated, a paper feed roller is provided so as to be able to pick up a sheet of recording paper stacked in the paper cassette 202, and conveyance rollers are provided so as to be able to convey the picked-up sheet of recording paper. Thus, a sheet of recording paper stacked in the paper cassette 202 is picked up, and conveyed to the conveyance path.

The recording paper S2 is further conveyed on a platen 211. The carriage 213 including the print head 212 is provided at a position facing the platen 211 with the recording paper S2 interposed between the carriage 213 and the platen 211. The carriage 213 is driven to reciprocate along the guide rail 214 by a carriage motor, which is not illustrated. A recording image is formed on the recording paper S2 by applying a driving pulse to the print head 212. The recording paper S2 on which the image has been formed is further conveyed by a paper ejection roller 215 and a paper ejection roller 216, and ejected to the paper ejection tray 203. The paper ejection roller 215 and the paper ejection roller 216 are provided on a downstream side in a conveyance direction with respect to the conveyance roller 209 and the conveyance roller 210 with the platen 211 interposed between the conveyance rollers 209 and 210 and the paper ejection rollers 215 and 216. Sheets of recording paper S2 on which an image has been formed, that is, the printed sheets of recording paper S2 are stacked on top of one another in the paper ejection tray 203.

A paper sensor 218 is provided in the carriage 213, and can detect whether the recording paper S2 is present on the platen 211. The paper sensor 218 is composed of, for example, a reflective optical sensor, and can perform the above-described detection by acquiring an output level of the paper sensor 218. In the present embodiment, since the paper sensor 218 is provided in the carriage 213, the output level of the paper sensor 218 is acquired while the carriage 213 is moving, and a position of an end of the recording paper S2 conveyed onto the platen 211 can thereby be detected.

Furthermore, a cassette sensor 219 and a cassette sensor 220 are respectively provided in the paper cassette 201 and the paper cassette 202, and thus can detect insertion or removal of the respective paper cassettes.

Figure 3:
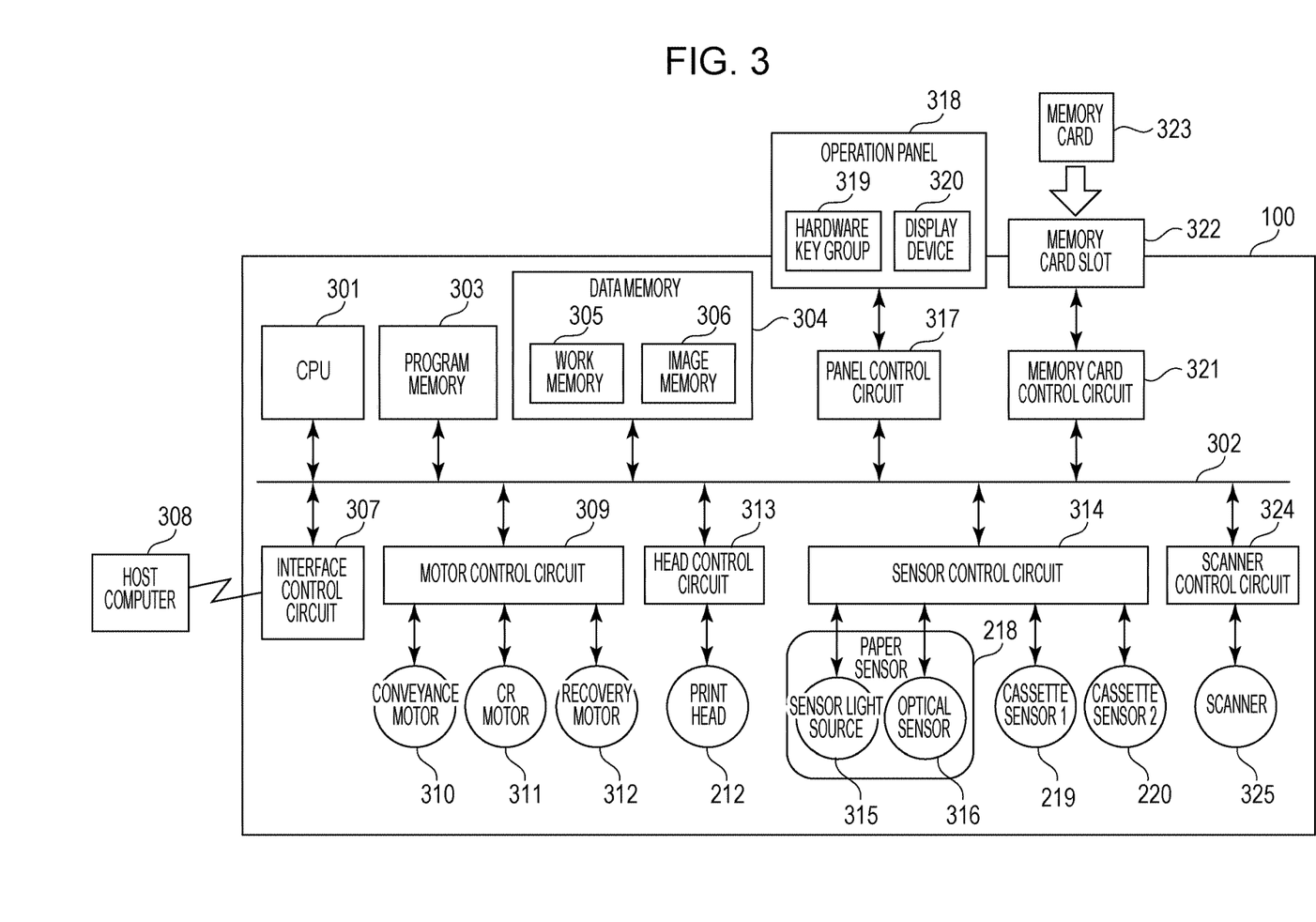
FIG. 3 is a block diagram illustrating the structure of a control system of the printing apparatus according to the first embodiment.

FIG. 3 is a block diagram illustrating the structure of a control system of the printing apparatus 100 according to the present embodiment. The printing apparatus 100 includes a CPU 301, a program memory 303, and a data memory 304. The printing apparatus 100 also includes an interface control circuit 307, a motor control circuit 309, a head control circuit 313, a sensor control circuit 314, a panel control circuit 317, a memory card control circuit 321, and a scanner control circuit 324. These are connected to one another via an internal bus 302.

The CPU 301 is a microprocessor (microcomputer) central processing unit, and controls operations performed by the entire printing apparatus 100 by executing a program or activating hardware. The program memory 303 is a read only memory (ROM), and stores fixed data necessary for a program executed by the CPU 301 and various operations performed by the printing apparatus 100. The data memory 304 is composed of a random access memory (RAM), is used as a work area for the CPU 301 and as a temporary storage area for various pieces of received data, and stores various pieces of setting data. The data memory 304 is used for applications of a work memory 305 that the CPU 301 uses when executing a control program, an image memory 306 that stores image data to be formed on recording paper, and so forth.

The CPU 301 can control the interface control circuit 307, receive print job data from a host computer 308 connected to the CPU 301 via an external interface, and notify the host computer 308 of the status of the printing apparatus 100.

The CPU 301 can control various motors that drive mechanisms of the printing apparatus 100 through the motor control circuit 309. A conveyance motor 310 drives the paper feed roller 204, the conveyance rollers 205, 206, 209, and 210, and the paper ejection rollers 215 and 216 so as to convey recording paper from the paper cassette 201 to the paper ejection tray 203. A carriage motor 311 (referred to as a CR motor in FIG. 3) drives the carriage 213 such that it reciprocates. A recovery motor 312 executes a recovery operation for maintaining an appropriate state of the print head 212 by driving a head recovery mechanism and controlling it in synchronism with driving of the carriage 213. The CPU 301 can control the print head 212 through the head control circuit 313. An image is formed on recording paper by controlling the print head 212 in synchronism with the reciprocating motion of the carriage 213.

The CPU 301 can control a sensor light source 315 of the paper sensor 218 and acquire an output voltage of an optical sensor 316 of the paper sensor 218 through the sensor control circuit 314. The CPU 301 can also control various cassette sensors through the sensor control circuit 314. The cassette sensor 219 (cassette sensor 1) for the paper cassette 1 and the cassette sensor 220 (cassette sensor 2) for the paper cassette 2 are each constituted by, for example, a photo interrupter and a mechanical switch. Each cassette sensor detects that a user has inserted or removed a paper cassette into or from the printing apparatus 100, and the CPU 301 can acquire the detection through the sensor control circuit 314.

The CPU 301 controls an operation panel 318 provided on an outer surface of the printing apparatus 100 through the panel control circuit 317. The operation panel 318 includes, for example, a hardware key group 319 and a display device 320. The panel control circuit 317 can display intended information on the display device 320 disposed on the operation panel 318, and monitor the user's operation of the hardware key group 319 similarly disposed on the operation panel 318.

The CPU 301 can control a scanner 325, which is not illustrated in FIG. 1, through the scanner control circuit 324, and a document image placed on the document positioning plate 101 of the scanner 325 can be scanned.

The CPU 301 can read from and write to various files in a memory card 323 inserted in a memory card slot 322 provided on the outer surface of the printing apparatus 100 through the memory card control circuit 321. An image scanned by the scanner 325 is stored in the image memory 306 in the data memory 304, and then can be transmitted to the host computer 308 or stored as an image file in the memory card 323. In addition, an image scanned by the scanner 325 is directly printed by controlling a printing mechanism. Thus the image scanned by the scanner 325 can be used in a copy function.

Here, control will be described which is performed when insertion of a paper cassette into the printing apparatus 100 is detected and a settings screen for corresponding paper information is displayed. It is noted that various operations performed by the printing apparatus 100, for example, print control, conveyance control, and so forth, are executed based on the paper information set by using the settings screen.

The CPU 301 of the printing apparatus 100 executes a paper cassette detection process with a predetermined period by using a periodic handler of a real-time operating system (OS) in the program memory 303. A period with which the paper cassette detection process is executed is determined in advance, and is set to a time period enough for control based on paper cassette insertion or removal to be performed. In the present embodiment, the period is 300 ms; however the period is not limited to this. If the cassette sensor 219 or 220 detects insertion of a paper cassette, a panel task of the CPU 301 that controls the operation panel 318 is notified of the detection. In the case of an apparatus including a plurality of paper cassettes, this process is performed for each paper cassette, and insertion actions of different paper cassettes are detected distinctively from each other.

Figure 4:
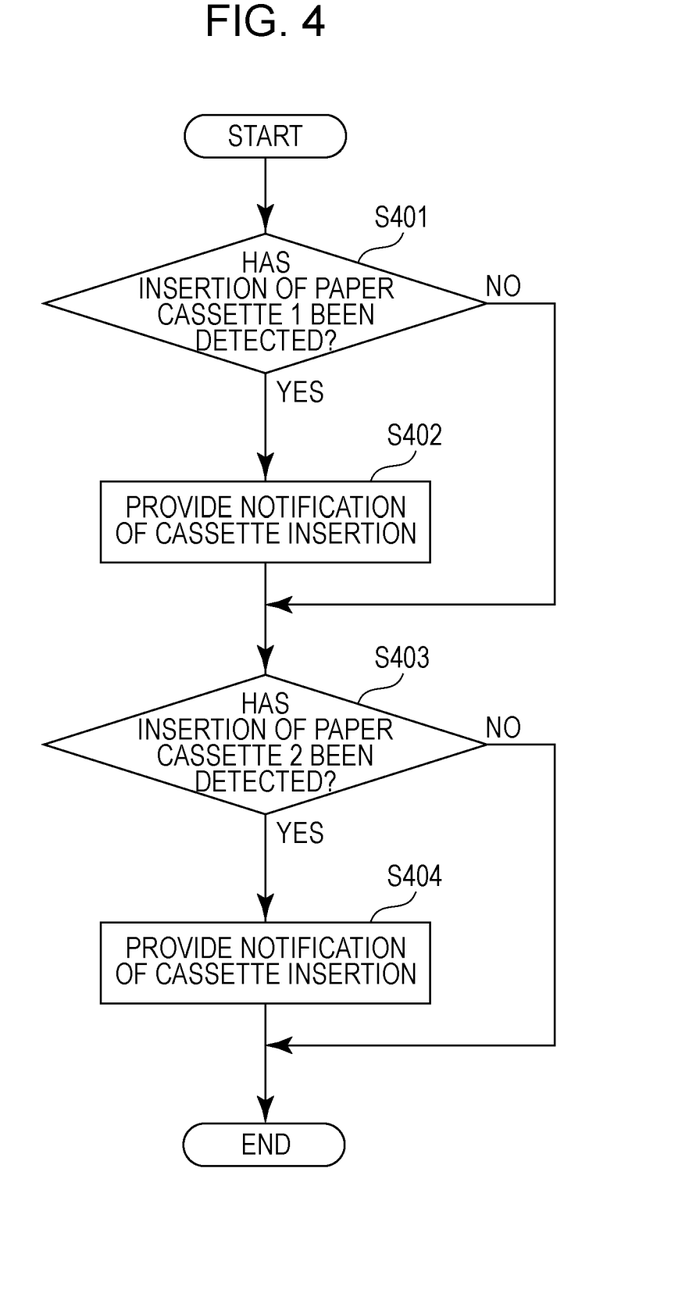
FIG. 4 is a flowchart of a paper cassette detection process in the printing apparatus according to the first embodiment.

The paper cassette detection process will be described with reference to FIG. 4. FIG. 4 is a flowchart of a process in which the CPU 301 loads a program stored in the program memory 303 into the data memory 304 and executes it. It is noted that the paper cassette detection process illustrated in FIG. 4 is executed every cycle. When the paper cassette detection process is started, it is determined whether an insertion action of the paper cassette 1 has been detected in S401. If it is determined that the insertion of the paper cassette 1 has been detected, the panel task of the CPU 301 is notified of the cassette insertion (S402), and the process proceeds to S403. If the insertion action of the paper cassette 1 is not detected, the process simply proceeds to S403. It is determined whether insertion of the paper cassette 2 has been detected in S403. If it is determined that the insertion action of the paper cassette 2 has been detected, the panel task is notified of the cassette insertion (S404), and the process ends. If the insertion action of the paper cassette 2 is not detected, the process ends. In this way, the panel task is notified of insertion when the insertion of the paper cassette 1 or the paper cassette 2 is detected, and the process simply ends if no notification is provided.

Figure 5A:
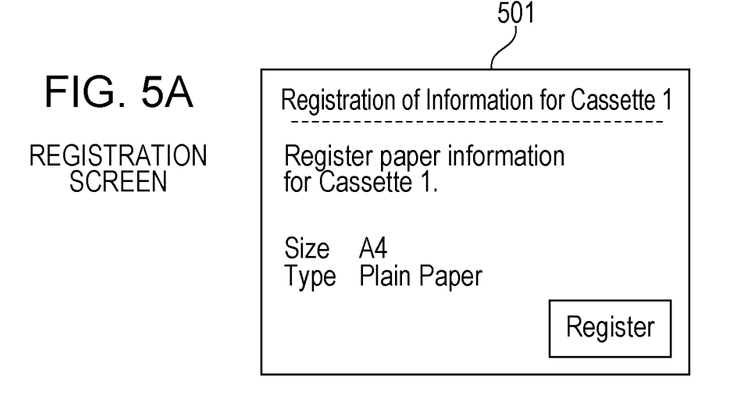
FIGS. 5A to 5C each illustrate an example of a settings screen for paper information in a display process according to the first embodiment.
Figure 5B:
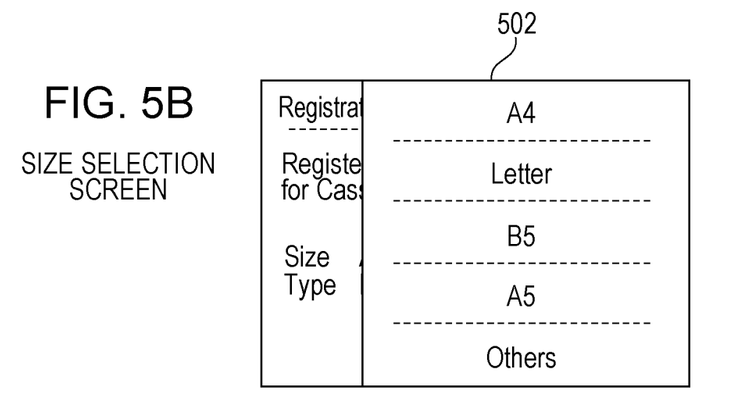
Figure 5C:
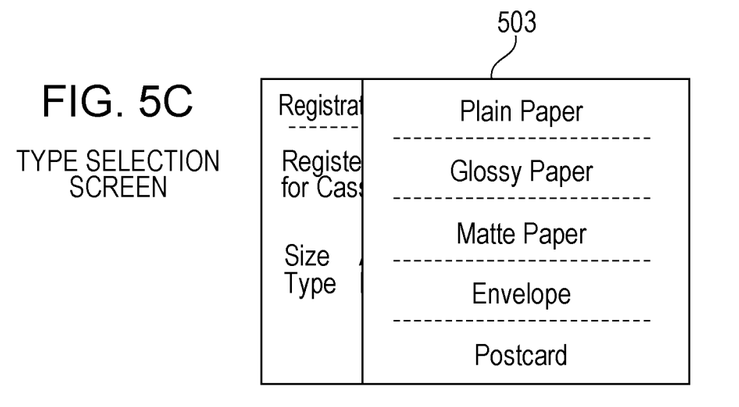

When the panel task is notified of detection of paper cassette insertion by a cassette sensor, a settings screen for paper information like that illustrated in each of FIGS. 5A to 5C is displayed on the display device 320 of the printing apparatus 100, and receives a user's input. The user inputs information on paper loaded in the inserted paper cassette by operating this settings screen.

FIGS. 5A to 5C each illustrate a settings screen displayed on the display device 320 if the cassette sensor 1 detects insertion of the paper cassette 1. A message prompting the user to set paper information to be set for the paper cassette 1 is displayed on a settings screen 501. In the present embodiment, "Register paper information for Cassette 1." is displayed as illustrated in FIG. 5A.

Here, the CPU 301 performs display control on the display device 320 through the panel control circuit 317. In the present embodiment, the operation panel 318 is composed of a touch panel; however, it is not limited to this. The operation panel 318 may be a display, such as a typical liquid crystal display (LCD) not including a touch panel sensor. The touch panel includes a touch panel sensor, detects a change in capacitance occurring due to the contact or approach of a finger, an electrically conductive medium, or the like, and thereby detects whether touch operation has been performed, and a touched location. The touch panel sensor is controlled by the CPU 301, and thereby detects "touch operation" in which the user touches the front surface of a liquid crystal display, "tap operation" in which the user releases his/her finger having touched the front surface without moving the finger on the front surface, and "drag operation" in which the user moves the finger having touched the front surface.

When a region next to "Size" is touched, a sub-window 502 is displayed so as to cover the settings screen 501 as illustrated in FIG. 5B. In the sub-window 502, the user touches a certain size, and the size is thereby selected. In addition, when a region next to "Type" is touched, a sub-window 503 is displayed so as to cover the settings screen 501 as illustrated in FIG. 5C. In the sub-window 503, the user touches a certain type, and the type of paper is thereby selected. It is noted that there is a limit to the number of items displayed in the sub-window 502 or sub-window 503 displayed, and thus, if a large number of sizes or types are included in a list, they are displayed so that the user can select from a pull-down list. Furthermore, a size and a type which have been set last time are displayed for "Size" and "Type" in the settings screen 501 which is in a default state before user's operation.

Then, when a Register button is touched in the settings screen 501 in FIG. 5A, a user's input is received, and setting of the paper information for the paper cassette 1 is completed. In the present embodiment, the Register button is displayed in the settings screen 501; however, it is noted that the Register button and a Cancel button may be provided. In this case, setting of the paper information for the paper cassette 1 is also completed if the Cancel button is touched. In this case, however, a determination process to be described is not executed.

The case of setting paper information for the paper cassette 2 is the same as that illustrated in FIGS. 5A to 5C except that "Register paper information for Cassette 2." is displayed in place of "Register paper information for Cassette 1.", and description thereof is omitted.

It is noted that a method for displaying a settings screen is not limited to that illustrated in FIGS. 5A to 5C. For example, although the Register button is displayed in FIG. 5A, this button is not displayed, and setting may be completed in response to a press of a button provided outside the display device 320 of the operation panel 318. A Forward button is also displayed, and setting may be completed based on the detection of a touch of the Forward button.

Here, control whether information set in the settings screen for paper information is to be reflected in another mode will be described. The case where information is reflected in a copy mode as an example here will be described.

Figure 6:
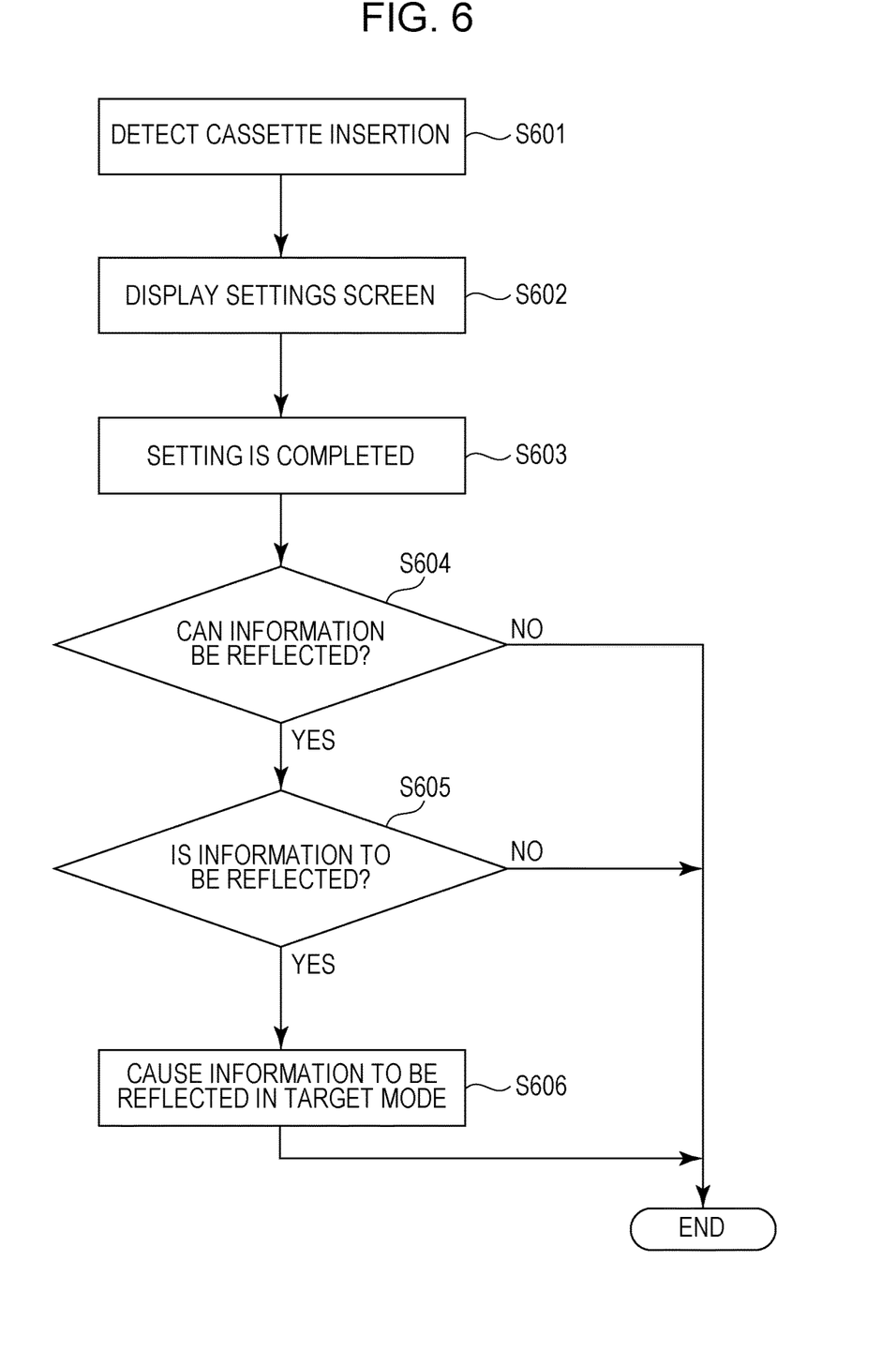
FIG. 6 is a flowchart illustrating a general description of a reflection process according to the first embodiment.

FIG. 6 is a flowchart illustrating a general description of a reflection process according to the present embodiment. In FIG. 6, the CPU 301 loads a program stored in the program memory 303 into the data memory 304 and executes it. When insertion of a paper cassette is detected in S601, a settings screen for the paper cassette is displayed in S602. Setting of paper information through the user's operation of the settings screen is completed in S603. This set information is transmitted as cassette information of the MFP to the host computer 308 on a host side when printing is performed. In addition, in the case where paper information of a print job differs from the cassette information, this set information is used when a warning of a mismatch is displayed. For example, if a size of B5 is specified as a paper setting for a cassette although a size of A4 is specified in a print job from a host, a warning is displayed so as to prompt the user to change a paper setting in the print job or paper loaded in the cassette. This prevents printing from being performed outside paper.

Subsequently, it is determined whether the input setting information (paper information) can be reflected in a specific mode in S604. In the present embodiment, it is determined whether the input setting information can be reflected in a copy mode. It is noted that the determination flow will be described later. If it is determined that the input setting information cannot be reflected (No in S604), the process simply ends. If it is determined that the input setting information can be reflected (Yes in S604), a screen for causing the user to select whether the input setting information is to be reflected in print settings for the copy mode is displayed. Then, it is determined, based on the user's operation of this screen, whether the information is to be reflected in the specific mode (S605).

Figure 7:
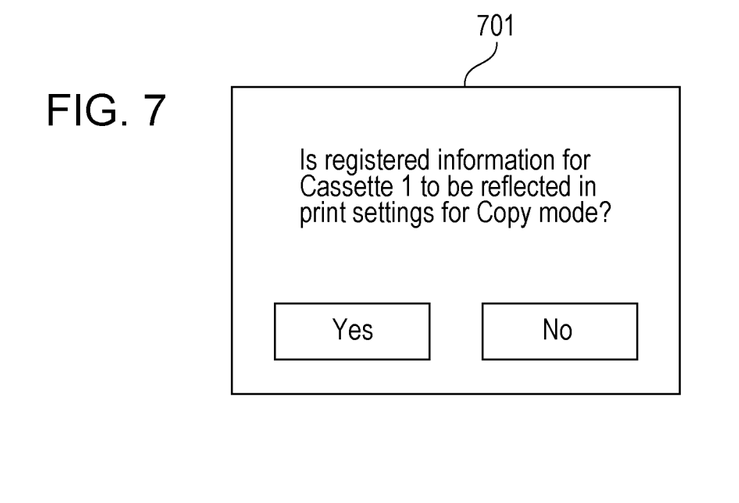
FIG. 7 illustrates an example of a selection screen for information reflection in the display process according to the first embodiment.

FIG. 7 illustrates an example of a selection screen for information reflection. This selection screen causes the user to select whether registered information is to be reflected in print settings for a specific mode. In FIG. 7, a message "Is registered information for Cassette 1 to be reflected in print settings for Copy mode?" is displayed, thereby prompting the user to select a Yes button or a No button. If the Yes button is selected, it is determined that the input setting information is to be reflected in the specific mode. If the No button is selected, it is determined that the input setting information is not to be reflected in the specific mode.

If it is determined that the information is to be reflected in the specific mode (Yes in S605), the information for print settings for the copy mode is reflected in the specific mode, which is a target mode, and thus updating is performed in S606, and then the process ends. On the other hand, if it is determined that the information is not to be reflected in the specific mode (No in S605), the process ends.

Figure 8A:
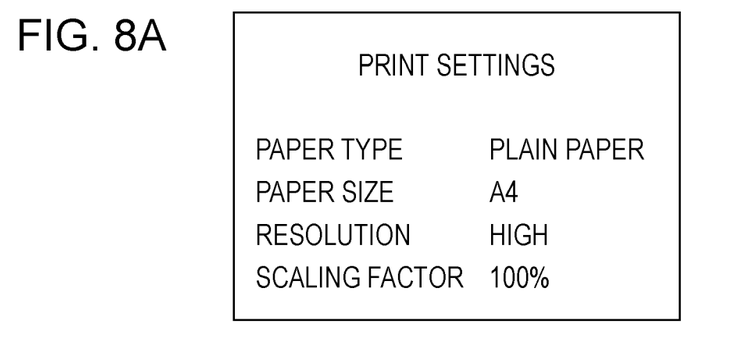
FIGS. 8A and 8B illustrate changes caused by information reflection in the reflection process according to the first embodiment.
Figure 8B:
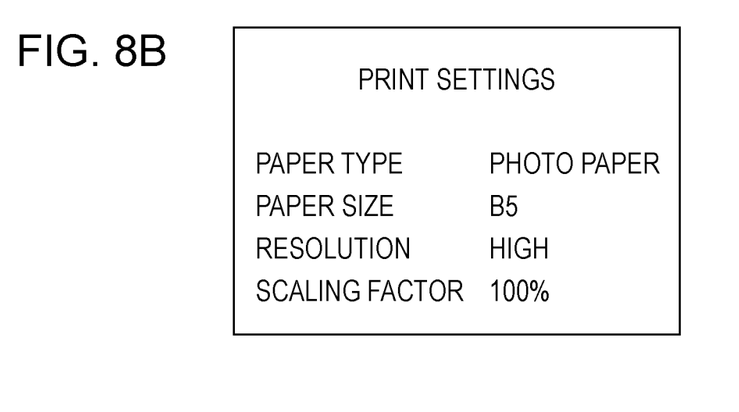

FIGS. 8A and 8B illustrate changes in setting information caused by information reflection. Print settings for copying before cassette removal are normal settings or settings used in last copying. In FIG. 8A, as for print settings for the copy mode before cassette removal, that is, before registration of settings, a paper type is set to plain paper, and a paper size is set to A4. After that, paper whose type is photo paper and whose size is B5 is loaded in a cassette, and the cassette is inserted. The settings screen 501 for paper information is displayed based on the detection of the insertion (S602), paper information is input, setting thereof is completed (S603), and reflection of the information is selected (S605). Thus, the information is reflected in the paper type and the paper size for the copy mode. Then, when the copy mode is entered, the settings are changed as illustrated in FIG. 8B, and thus the user does not have to input the same settings again. It is noted that, after the information is reflected in the target mode in S606, print settings after reflection illustrated in FIG. 8B may be displayed on a screen so as to prompt the user to check the print settings. The updated print settings serves as settings of a job when subsequent copying is performed, and are used as conditions for a scan area of a document on the document positioning plate 101 and paper to be fed.

Figure 9:
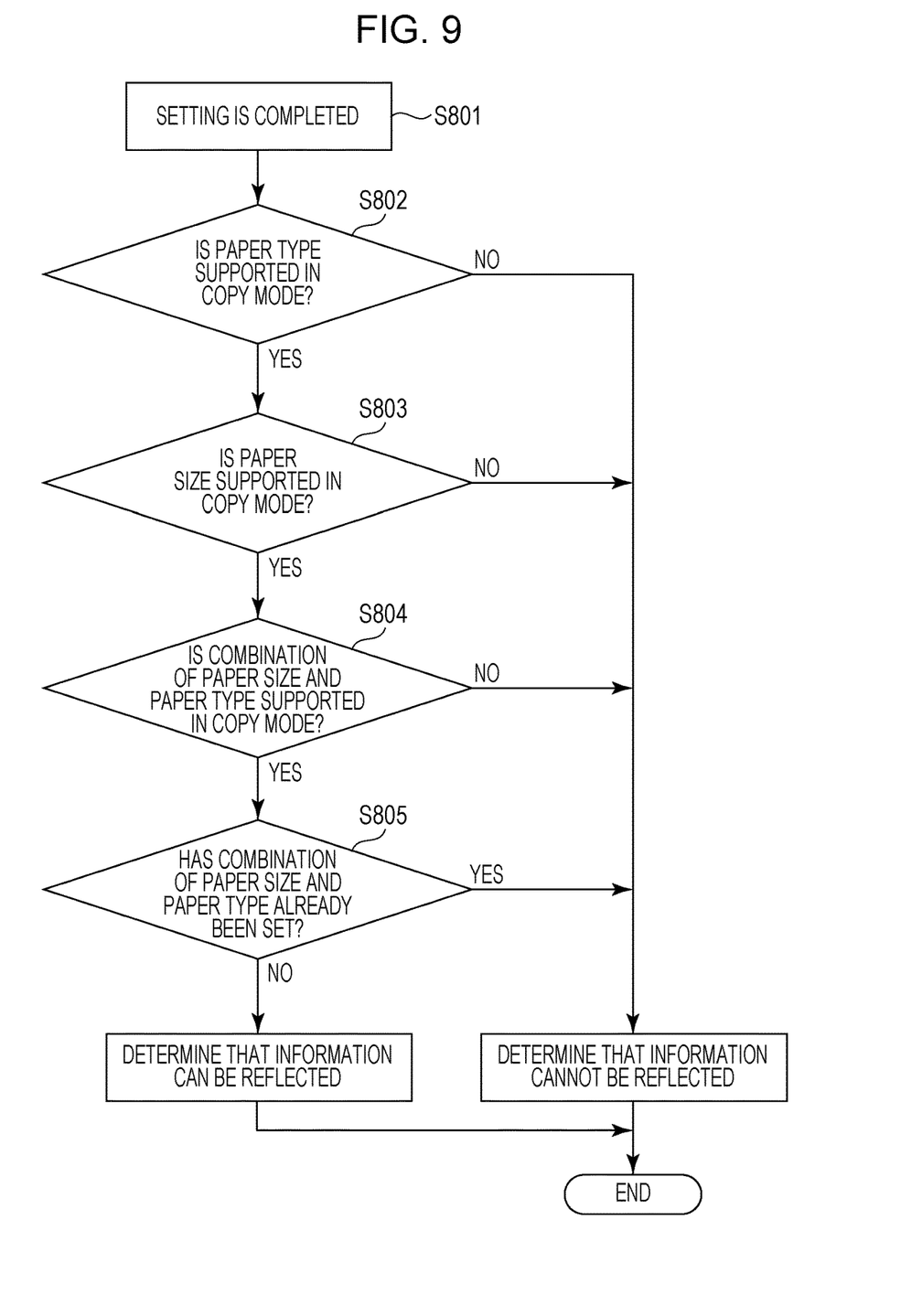
FIG. 9 is a flowchart illustrating a determination whether information can be reflected in the reflection process according to the first embodiment.

Here, the flow of S604 will be described in which a determination whether the input setting information can be reflected in the copy mode is made. FIG. 9 is a flowchart illustrating a general description of the determination process. In FIG. 9, the CPU 301 loads a program stored in the program memory 303 into the data memory 304 and executes it.

When setting of paper information by the user is completed in S801 (corresponding to S603), a determination is made based on four determination criteria in the present embodiment whether the setting information thereof is information that can be reflected in the copy mode.

It is determined whether the set paper type can be dealt with in the copy mode, that is, whether the set paper type is supported in the copy mode in S802. Then, if the set paper type can be dealt with in the copy mode (Yes in S802), the process proceeds to S803, and if the set paper type cannot be dealt with in the copy mode (No in 802), the process ends. For example, if glossy paper is not supported in the copy mode of the apparatus although glossy paper has been set, it is determined that the setting information cannot be reflected.

It is determined whether the set paper size can be dealt with in the copy mode, that is, whether the set paper size is supported in the copy mode in S803. Then, if the set paper size can be dealt with in the copy mode (Yes in S803), the process proceeds to S804, and if the set paper size cannot be dealt with in the copy mode (No in S803), it is determined that the setting information cannot be reflected. For example, if A2-size paper is not supported in the copy mode of the apparatus although a size of A2 has been set, it is determined that the setting information cannot be reflected.

It is determined whether a combination of the set paper type and paper size can be dealt with in the copy mode, that is, whether the combination is supported in the copy mode in S804. Then, if the combination can be dealt with in the copy mode (Yes in S804), the process proceeds to S805, and if the combination cannot be dealt with in the copy mode (No in S804), it is determined that the setting information cannot be reflected. For example, if A4-size glossy paper has been set, in some cases, A4-size glossy paper is not supported although the size of A4 and the type of glossy paper are each supported in the copy mode of the apparatus. In this case, a contradiction between settings arises even if the setting information is reflected, and thus it is determined that the setting information cannot be reflected.

It is determined whether the set paper settings have already been set in the copy mode in S805. Then, if the set paper settings have already been set in the copy mode (Yes in S805), it is determined that the setting information cannot be reflected. If the set paper settings have not been set in the copy mode (No in S805), it is determined that the setting information can be reflected. Even if settings are valid in the copy mode, displaying a selection screen 701 for paper information reflection is redundant if the settings have already been set, and thus it is determined that the setting information cannot be reflected so that the selection screen 701 for reflection is not displayed.

Through the above-described determination process, only if it is determined that settings are valid in the copy mode and different from present settings for the copy mode, the selection screen 701 for paper information reflection can be displayed.

In the present embodiment, as described above, if settings are set with a settings screen for paper information, the user is prompted to determine whether the settings are to be reflected only if the settings can be reflected in even a specific mode. Thus, the paper cassette information can be optionally reflected or not based on a user's determination. On the other hand, even if settings are set with the settings screen for paper information, the user is not prompted to determine whether the settings are to be reflected if the settings are not valid in the specific mode, and thus user's operation does not become redundant.

In the present embodiment, the user who wants to perform printing immediately with registered information can omit to input print conditions when a specific mode is activated (for example, to input print conditions for the copy mode), and other users can only register paper cassette information. Hence, the number of user's input actions can be minimized.

In the present embodiment, even if paper settings are stored for each individual mode, paper cassette information can be reflected in each mode with ease. This can enhance usability when information on a print medium is set.

Second Embodiment

In the first embodiment, the copy mode is described as an example of a target mode that reflects setting information for paper settings; however, in a second embodiment, the case where setting information for paper settings is reflected in a plurality of modes will be described. It is noted that components that are the same as those in the first embodiment are denoted by the same reference numerals, and repeated description thereof is omitted.

Figure 10A:
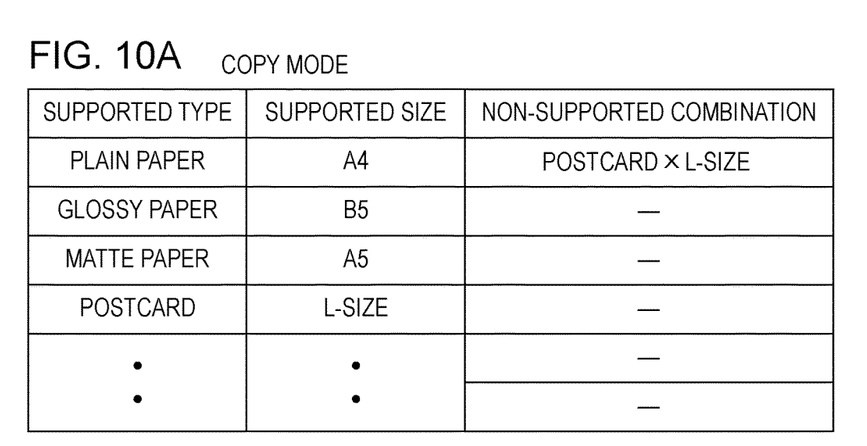
FIGS. 10A to 10C illustrate examples of correspondence tables of paper information for respective modes in a process according to a second embodiment.
Figure 10B:
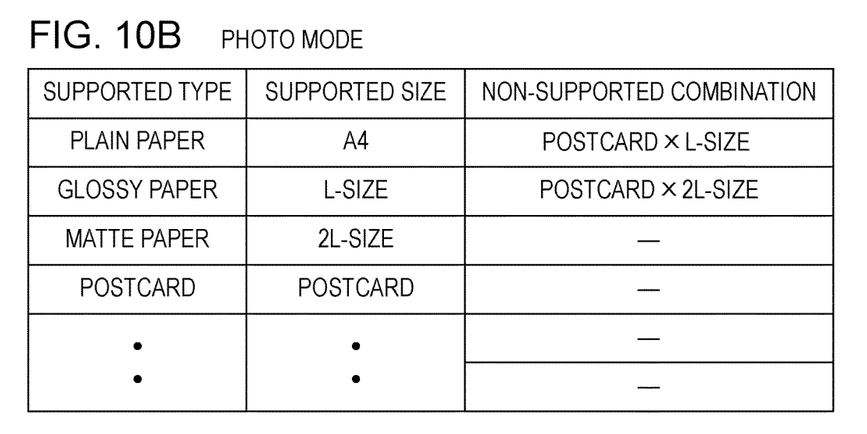
Figure 10C:
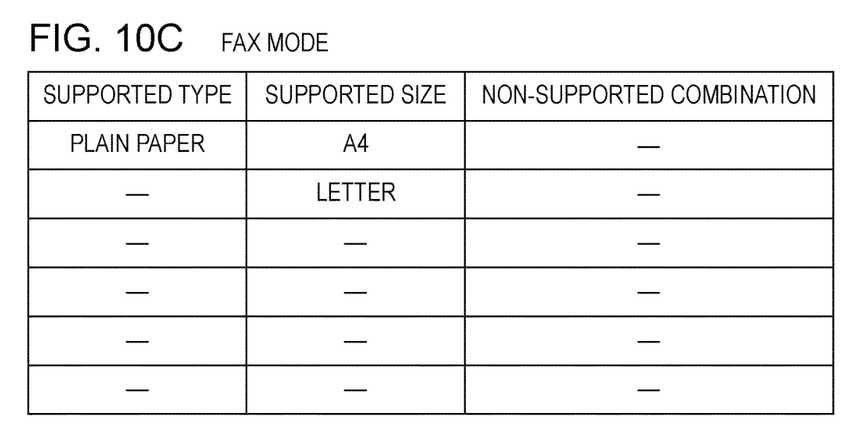

In the present embodiment, a correspondence table is created for each mode. A supported paper type, a supported paper size, and a non-supported combination of a paper type and a paper size are registered. FIGS. 10A to 10C illustrate examples of correspondence tables for respective modes. In addition to the copy mode, a photo mode and a FAX mode are given as examples here. The photo mode is a mode in which image data or the like stored in an external medium is printed, and paper information is used as conditions for paper to be fed. The FAX mode is a mode in which scanned document data is faxed, or in which an externally faxed document is received, and paper information is used as conditions for paper to be fed.

Figure 11:
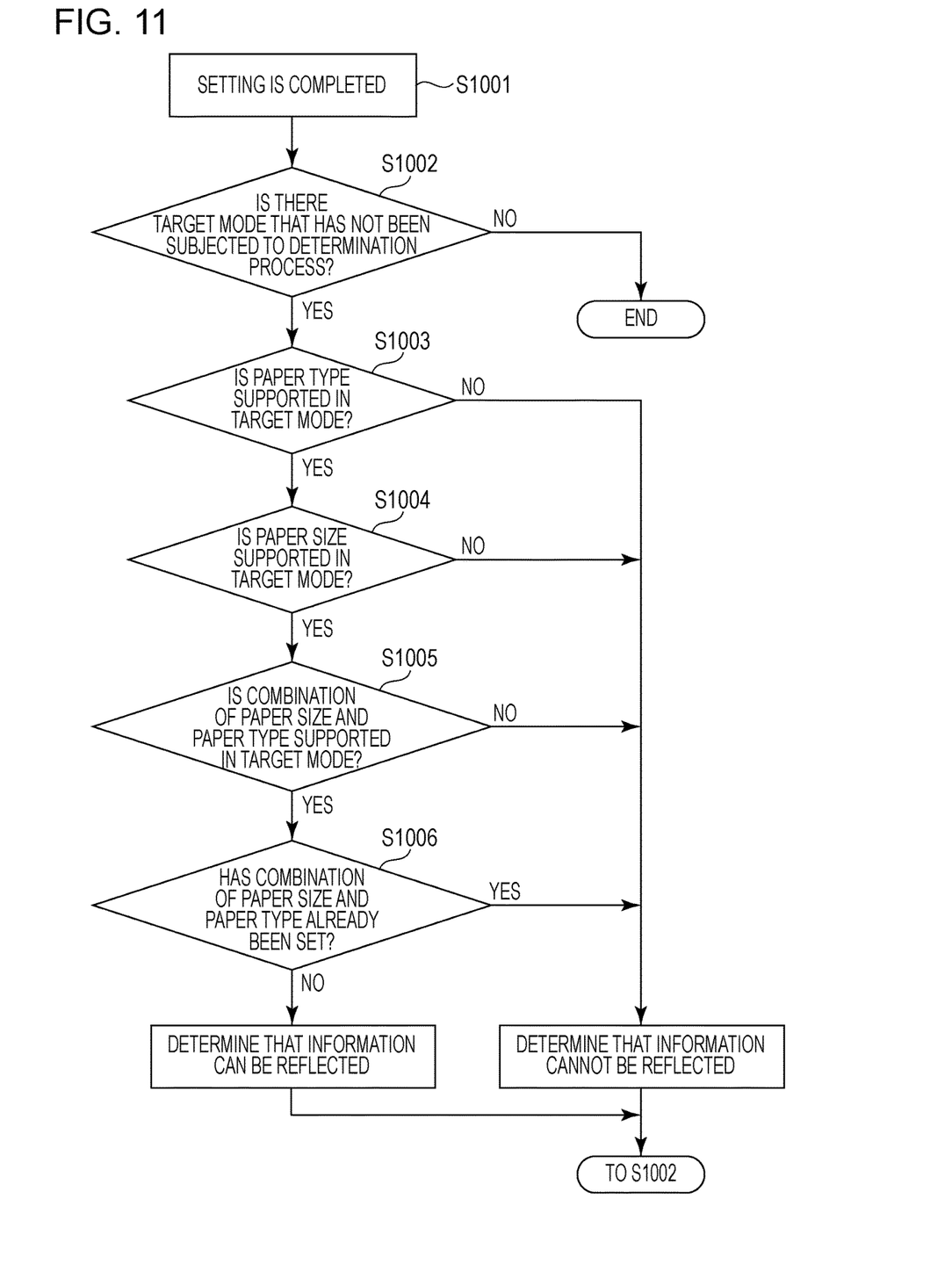
FIG. 11 is a flowchart illustrating a determination whether information can be reflected in the process according to the second embodiment.

Here, in the present embodiment, the flow of S604 will be described in which a determination whether the input setting information can be reflected in the copy mode is made. FIG. 11 is a flowchart illustrating a general description of the determination process. This is a flow in which a determination whether the input setting information can be reflected in a target mode is made, and is a flow obtained by adapting the flowchart illustrated in FIG. 9 for a plurality of modes. The process is basically the same as that in FIG. 9, and thus only differences between FIG. 11 and FIG. 9 will be described below. In FIG. 11, the CPU 301 loads a program stored in the program memory 303 into the data memory 304 and executes it.

When setting of paper information by the user is completed in S1001 (corresponding to S603), it is determined whether there is a target mode that has not been subjected to the determination process in S1002. In the present embodiment, since there are a copy mode, a photo mode, and a FAX mode as three target modes, the process is performed in a loop until each of the three modes is subjected to the determination process. Hence, a maximum of three selection screens for information reflection are displayed after the process ends. When the determination process is completed for all the target modes, the process ends. If there is any one of the target modes that have not been subjected to the determination process, the process proceeds to S1003.

It is determined whether the set paper type can be dealt with in the target mode, that is, whether the set paper type is supported in the target mode in S1003. Here, information whether the set paper type is supported in the target mode is acquired with reference to the above-described correspondence table. Then, if the set paper type can be dealt with in the target mode (Yes in S1003), the process proceeds to S1004, and if the set paper type cannot be dealt with in the target mode (No in S1003), it is determined that the setting information cannot be reflected. Then, the process returns to S1002.

It is determined whether the set paper size can be dealt with in the target mode, that is, whether the set paper size is supported in the target mode in S1004. Here, information whether the set paper size is supported in the target mode is acquired with reference to the above-described correspondence table. Then, if the set paper size can be dealt with in the target mode (Yes in S1004), the process proceeds to S1005, and if the set paper size cannot be dealt with in the target mode (No in S1004), it is determined that the setting information cannot be reflected. Then, the process returns to S1002.

It is determined whether a combination of the set paper type and paper size can be dealt with in the target mode, that is, whether the combination is supported in the target mode in S1005. Here, it is checked whether the combination of the paper type and the paper size is registered as a non-supported combination with reference to the above-described correspondence table. Then, if the combination can be dealt with in the target mode (Yes in S1005), the process proceeds to S1006, and if the combination cannot be dealt with in the target mode (No in S1005), it is determined that the setting information cannot be reflected. Then, the process returns to S1002.

It is determined whether the set paper settings have already been set in the target mode in S1006. Then, if the set paper settings have already been set in the target mode (Yes in S1006), it is determined that the setting information cannot be reflected. Then, the process returns to S1002. If the set paper settings have not been set in the target mode (No in S1006), it is determined that the setting information can be reflected. Even if settings are valid in the target mode, displaying the selection screen 701 for paper information reflection is redundant if the settings have already been set, and thus it is determined that the setting information cannot be reflected so that the selection screen 701 for reflection is not displayed. Then, the process returns to S1002.

In the present embodiment, when a screen for causing the user to select whether the input setting information is to be reflected in print settings for a specific mode is displayed in S605, the user is caused to select whether the setting information is to be reflected in all the modes in which it has been determined that the setting information can be reflected in S604. It is noted that the way to display the screen is not limited to this, and selection screens may be displayed in sequence for respective modes in which it has been determined that the setting information can be reflected in S604, or all the modes in which it has been determined that the setting information can be reflected in S604 may be displayed in a selection screen so that the setting information is reflected in only a mode selected by the user.

In the present embodiment, as described above, if settings are set with a settings screen for paper information, the user is prompted to determine whether the settings are to be reflected if the settings can be reflected in each of a plurality of modes. Thus, the paper cassette information can be optionally reflected or not based on a user's determination. On the other hand, even if settings are set with the settings screen for paper information, the user is not prompted to determine whether the settings are to be reflected if the settings are not valid in a target mode, and thus user's operation does not become redundant.

Other Embodiments

The above-described exemplary embodiments are not seen to be limiting. For example, while a paper cassette is described as an example of a paper feed unit, a paper feed unit other than the paper cassette can be provided. Other examples of the paper feed unit include, but are not limited to, an auto sheet feeder (ASF) and a manual feed unit.

In the determination process in the above-described embodiments, while a determination is made based on the four determination criteria, the determination is not limited to these criteria. For example, a determination can be based on two determination criteria whether the paper type is supported in a specific mode and whether the paper size is supported in the specific mode. If both are supported, setting information can be reflected. If either is no supported, it is determined that setting information cannot be reflected.

Furthermore, in the determination process in the above-described embodiments, the order of determinations whether the paper type is supported in the specific mode and whether the paper size is supported in the specific mode may be reversed.

In the above-described embodiments, if it is determined that settings of paper information can be reflected, the user selects whether the set information on a print medium is to be reflected in setting conditions for a specific mode. The way in which reflection is performed is not limited to this approach. For example, the set information may be automatically reflected in the setting conditions for the specific mode (the setting conditions for the specific mode may be automatically updated to the set information) without prompting the user to make a determination.

Furthermore, in the above-described embodiments, while the printing apparatus includes the control system (control apparatus), the printing apparatus is not limited to this. In the case where a settings screen is displayed on a display unit of an external apparatus including a printer driver connected to the printing apparatus illustrated in FIG. 1, or in the case where a settings screen is displayed on the display device (display unit) of the printing apparatus based on an instruction from the external apparatus, this external apparatus serves as a control apparatus.

In the above-described embodiments, while a settings screen is displayed based on the detection of insertion of any paper cassette, the way to display the settings screen is not limited to this. The settings screen can be displayed based on an instruction for registration of settings of paper information based on user's operation. That is, if setting of the paper information is completed, a determination is made whether the information can be reflected in a specific mode, and a selection screen for reflection is displayed.

In the above-described embodiments, while information on a print medium of a paper cassette is setting information, the setting information is not limited to this, and may be setting information or the like of print settings.

The above-described embodiments can enhance usability when information on a print medium is set.

Exemplary embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the present disclosure is not limited to these exemplary embodiments. The scope of the following claims is to be accorded the broadest interpretation so as to encompass all such modifications and equivalent structures and functions.

This application claims the benefit of Japanese patent application no. 2014-161641, filed Aug. 7, 2014, which is hereby incorporated by reference herein in its entirety.

What is claimed is:

1. A control apparatus comprising at least one processor and at least one memory coupled to each other and operating to:
set information on a print medium in a feed unit based or a user input;
determine, if the information on the print medium is set, whether the set information on the print medium can be reflected in a setting condition for a specific function mode, the specific function mode being a mode for outputting images using a specific function; and
update, if it is determined that the set information on the print medium can be reflected in the setting condition for the specific function mode, the setting condition for the specific function mode to reflect the set information on the print medium.

2. The control apparatus according to claim 1, wherein, if the set information on the print medium corresponding to the user input has been set in the specific function mode, the at least one processor and the at least one memory do not update the setting condition.

3. The control apparatus according to claim 1, wherein the at least one processor and the at least one memory further operate to
enable a selection to be made as to whether the set information on the print medium is to be reflected in the setting condition for the specific function mode, if it is determined that the set information on the print medium can be reflected, and
wherein, if it is selected that the set information on the print medium is to be reflected in the setting condition for the specific function mode, the at least one processor and the at least one memory operate to update the setting condition for the specific function mode to reflect the set information on the print medium.

4. The control apparatus according to claim 3, wherein the at least one processor and the at least one memory operate to cause a display unit to display a selection screen for enabling a user to select whether the set information on the print medium is to be reflected in the setting condition for the specific function mode.

5. The control apparatus according to claim 1, wherein, if the feed unit is operated by a user, the at least one processor and the at least one memory operate to cause a display unit to display a settings screen for enabling a user to input information on a print medium in the feed unit operated by the user.

6. The control apparatus according to claim 5, wherein the at least one processor and the at least one memory further operate to detect that the feed unit has been operated by the user, and
wherein the at least one processor and the at least one memory operate to cause the display unit to display the settings screen in response to detection.

7. The control apparatus according to claim 6, wherein the at least one processor and the at least one memory operate to detect an insertion action of the feed unit taken by the user.

8. The control apparatus according to claim 1, wherein the information on the print medium is at least one of a type of the print medium or a size of the print medium.

9. The control apparatus according to claim 8, wherein the information on the print medium is the type of the print medium and the size of the print medium, and
wherein, if a combination of the type of the print medium and the size of the print medium that have been set is not supported in the specific function mode, it is determined that the set information on the print medium cannot be reflected.

10. The control apparatus according to claim 1, wherein the at least one processor and the at least one memory operate to receive the user input that is input through a settings screen; and
store the received user input.

11. The control apparatus according to claim 1, further comprising a printing unit configured to perform printing on the print medium.

12. The control apparatus according to claim 1, wherein the specific function mode includes at least one of a copy mode, a photo mode, and a FAX mode.

13. A control method for controlling an apparatus, the method comprising:
at the apparatus, setting information on a print medium in a feed unit based on a user input;
determining, if the information on the print medium is set, whether the set information on the print medium can be reflected in a setting condition for a specific function mode, the specific function mode being a mode for outputting images using a specific function; and
updating, if it is determined that the set information on the print medium can be reflected in the setting condition for the specific function mode, the setting condition for the specific function mode to reflect the set information on the print medium.

14. The control method according to claim 13, wherein, if the set information on the print medium corresponding to the user input has been set in the specific function mode, the setting condition is not updated.

15. The control method according to claim 13, further comprising
if it is determined that the set information on the print medium can be reflected, enabling, at the apparatus, a selection to be made as to whether the set information on the print medium is to be reflected in the setting condition for the specific function mode,
wherein, if it is selected that the set information on the print medium is to be reflected in the setting condition for the specific function mode, the setting condition for the specific function mode is updated to reflect the information on the print medium.

16. The control method according to claim 13, wherein, if the feed unit is operated by a user, a settings screen for enabling a user to input information on a print medium in the feed unit operated by the user is displayed.

17. The control method according to claim 13, wherein the information on the print medium is at least one of a type of the print medium or a size of the print medium.

18. A non-transitory computer-readable storage medium storing computer executable instructions for causing a computer to execute a method, the method comprising:
setting, using at least one processor, information on a print medium in a feed unit based on a user input;
if the information on the print medium is set, determining, using the at least one processor, whether the set information on the print medium can be reflected in a setting condition for a specific function mode, the specific function mode being a mode for outputting images using a specific function; and
if it is determined that the set information on the print medium can be reflected, updating, using the at least one processor, the setting condition for the specific function mode to reflect the set information on the print medium.

19. The non-transitory computer-readable storage medium according to claim 18, further comprising
enabling, using the at least one processor, a selection to be made as to whether the set information on the print medium is to be reflected in the setting condition for the specific function mode if it is determined that the set information on the print medium can be reflected,
wherein, if it is selected that the set information on the print medium is to be reflected in the setting condition for the specific function mode, the setting condition for the specific function mode is updated to reflect the set information on the print medium.

20. The non-transitory computer-readable storage medium according to claim 18, wherein, if the feed unit is operated by a user, a settings screen for enabling a user to input information on a print medium in the feed unit operated by the user is displayed.

21. A control apparatus comprising at least one processor and at least one memory coupled to each other and operating to:
   set information on a type of a print medium and a size of the print medium in a feed unit based on a user input;
   determine, if the information is set, whether a combination of the type of the print medium and the size of the print medium that have been set is a predetermined combination; and
   update, if it is determined that the combination of the type of the print medium and the size of the print medium that have been set is the predetermined combination, a setting condition for a specific function mode to reflect the set information.

* * * * *